(12) United States Patent
Matsumoto et al.

(10) Patent No.: US 9,287,544 B2
(45) Date of Patent: Mar. 15, 2016

(54) HEAT-RESISTANT POROUS FILM, SEPARATOR FOR NONAQUEOUS BATTERY, AND NONAQUEOUS BATTERY

(75) Inventors: Nobuaki Matsumoto, Ibaraki (JP); Hisao Kanzaki, Ibaraki (JP)

(73) Assignee: HITACHI MAXELL, LTD., Ibaraki-Shi, Osaka (JP)

( * ) Notice: Subject to any disclaimer, the term of this patent is extended or adjusted under 35 U.S.C. 154(b) by 334 days.

(21) Appl. No.: 13/821,728

(22) PCT Filed: Oct. 3, 2011

(86) PCT No.: PCT/JP2011/072736
§ 371 (c)(1), (2), (4) Date: Mar. 8, 2013

(87) PCT Pub. No.: WO2013/051079
PCT Pub. Date: Apr. 11, 2013

(65) Prior Publication Data
US 2014/0045031 A1 Feb. 13, 2014

(51) Int. Cl.
H01M 2/14 (2006.01)
H01M 2/16 (2006.01)
H01M 10/42 (2006.01)
H01M 10/052 (2010.01)

(52) U.S. Cl.
CPC .......... *H01M 2/1686* (2013.01); *H01M 2/1653* (2013.01); *H01M 10/4235* (2013.01); *H01M 10/052* (2013.01)

(58) Field of Classification Search
CPC .............................. H01M 2/16; H01M 2/1686
USPC .................... 429/144, 124, 127, 246, 254; 252/182.1, 506, 519.32
See application file for complete search history.

(56) References Cited

U.S. PATENT DOCUMENTS

| | | | |
|---|---|---|---|
| 6,447,958 B1 | 9/2002 | Shinohara et al. | |
| 7,691,528 B2 | 4/2010 | Hennige et al. | |
| 2002/0127474 A1* | 9/2002 | Fleischer et al. | 429/309 |
| 2004/0166407 A1 | 8/2004 | Nakajima et al. | |
| 2005/0221165 A1 | 10/2005 | Hennige et al. | |
| 2006/0194116 A1* | 8/2006 | Suzuki et al. | 429/251 |
| 2007/0264577 A1 | 11/2007 | Katayama et al. | |
| 2009/0067119 A1 | 3/2009 | Katayama et al. | |
| 2009/0111025 A1 | 4/2009 | Lee et al. | |

(Continued)

FOREIGN PATENT DOCUMENTS

JP 2000-30686 A 1/2000
JP 2005-536858 A 12/2005

(Continued)

OTHER PUBLICATIONS

International Search Report issued in PCT/JP2011/072736, mailed on Jun. 19, 2012.

*Primary Examiner* — Kenneth Douyette
(74) *Attorney, Agent, or Firm* — Birch, Stewart, Kolasch & Birch, LLP

(57) ABSTRACT

A nonaqueous battery having a high level of safety and high-temperature storability, a heat-resistant porous film capable of serving as a separator material for separating positive and negative electrodes from each other and capable of forming the nonaqueous battery, and a separator capable of forming the nonaqueous battery are provided.

10 Claims, 1 Drawing Sheet

(56) References Cited

U.S. PATENT DOCUMENTS

| | | |
|---|---|---|
| 2010/0068612 A1 | 3/2010 | Nishikawa |
| 2011/0052987 A1 | 3/2011 | Katayama et al. |
| 2011/0143183 A1 | 6/2011 | Matsumoto et al. |
| 2011/0217596 A1* | 9/2011 | Ogawa .................. H01M 4/62 429/300 |
| 2011/0256442 A1 | 10/2011 | Kageira et al. |
| 2012/0315530 A1 | 12/2012 | Kageura |

FOREIGN PATENT DOCUMENTS

| | | |
|---|---|---|
| JP | 2008-524824 A | 7/2008 |
| JP | 2008-300362 A | 12/2008 |
| JP | 2010-170993 A | 8/2010 |
| JP | 2011-54503 A | 3/2011 |
| JP | 2011-192644 A | 9/2011 |
| WO | WO 2006/062153 A1 | 6/2006 |
| WO | WO 2009/044741 A1 | 4/2009 |

* cited by examiner

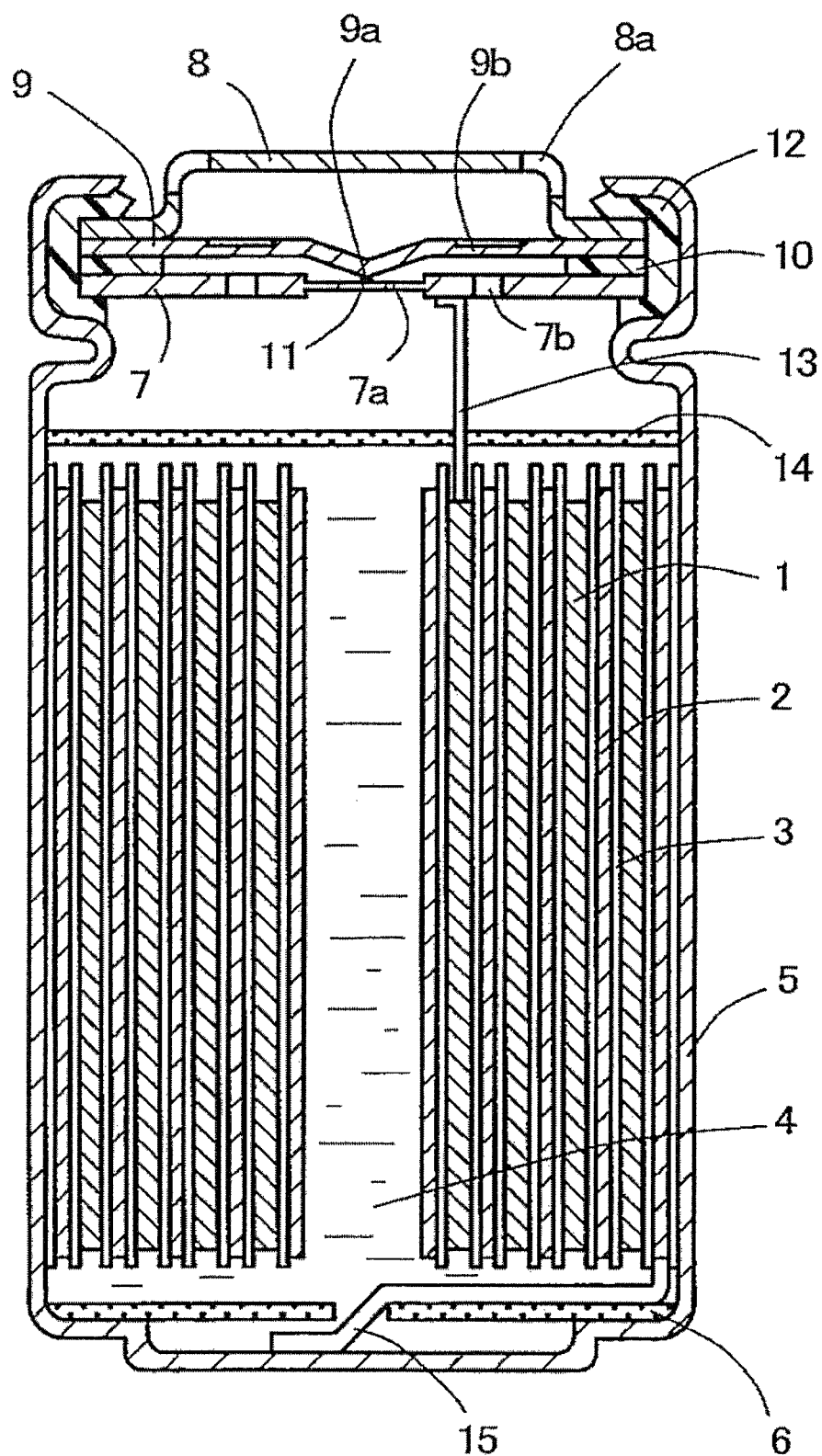

HEAT-RESISTANT POROUS FILM, SEPARATOR FOR NONAQUEOUS BATTERY, AND NONAQUEOUS BATTERY

TECHNICAL FIELD

The present invention relates to a heat-resistant porous film suitable for use in a nonaqueous battery as a separator material for separating the positive electrode and the negative electrode from each other, a separator for a nonaqueous battery using the heat-resistant porous film, and a nonaqueous battery that includes the heat-resistant porous film or the separator for a nonaqueous battery and has an excellent level of safety and storability.

BACKGROUND ART

Lithium secondary batteries, a type of nonaqueous batteries, are characterized by their high energy density, and thus are used widely as power sources for portable devices such as portable phones and notebook personal computers. Furthermore, by taking advantage of their high energy density characteristics, studies on use of lithium secondary batteries as power sources for vehicles, such as electronically assisted bicycles, electric motorcycles, electric vehicles and hybrid vehicles, have been conducted in recent years. Since such power sources for use in vehicles are larger in capacity than power sources for portable devices, it is important to ensure further safety of the batteries.

In currently available lithium secondary batteries, polyolefin-based microporous films (microporous membranes) having a thickness of, for example, about 20 to 30 μm are used as separators for being interposed between positive and negative electrodes. Of polyolefins, materials having a low melting point such as polyethylene may be used as separator raw materials in order to ensure a so-called shutdown effect. The shutdown effect improves the safety of a battery in the event of shorting or the like by allowing the constituent resin of the separator to melt at a temperature equal to or lower than the thermal runaway temperature of the battery to close the pores, thereby increasing the internal resistance of the battery.

By the way, uniaxially- or biaxially-oriented films are used as these separators for increased porosity and to improved strength, for example. Since such separators are provided as independent films, they are required to have a certain level of strength in view of workability, etc., and the drawing ensures their strength. In such oriented films, however, the degree of crystallinity is increased, and the level of the shutdown temperature is also increased close to the thermal runaway temperature of the battery. Thus, it is hard to say that the margin for ensuring the safety of the battery is adequate.

Moreover, the films have been distorted as a result of the drawing and may shrink due to residual stress when they are subjected to high temperatures. The shrinkage temperature is very close to the melting point, namely, the shutdown temperature. Therefore, when using such a polyolefin-based microporous film separator, the current must be reduced to prevent a rise in the temperature of the battery as soon as the temperature of the battery reaches the shutdown temperature in the event of, for example, abnormal charging. If the pores cannot be closed adequately and the current cannot be reduced right away, the temperature of the battery can elevate easily to the shrinkage temperature of the separator, so that internal shorting may pose the danger of ignition.

As a technique for improving the reliability of a battery by preventing such shorting resulting from thermal shrinkage of a separator, for example, it has been proposed to use a separator including a highly heat-resistant porous base material, filler particles and a resin component for ensuring the shutdown function to form an electrochemical device (Patent Documents 1 to 3).

It has been also proposed to improve the heat resistance of a polyolefin porous film by forming on the film a heat-resistant layer predominantly composed of a heat-resistant resin and inorganic fine particles (Patent Documents 4 to 6).

According to the techniques disclosed by Patent Documents 1 to 6, batteries having an excellent level of safety in which thermal runaway is less likely to occur even in the event of abnormal overheating can be provided.

PRIOR ART DOCUMENTS

Patent Documents

Patent Document 1: WO 2006/62153
Patent Document 2: JP 2005-536858 A
Patent Document 3: WO 2009/44741
Patent Document 4: JP 2000-30686 A
Patent Document 5: JP 2008-300362 A
Patent Document 6: JP 2008-524824 A

DISCLOSURE OF INVENTION

Problem to be Solved by the Invention

By the way, when using a lithium secondary battery in a vehicle, for example, the environment in which the battery is used is likely to be very hot, so that the battery is required to be safe as well as to have good high-temperature storability at the same time.

With the foregoing in mind, it is an object of the present invention to provide a nonaqueous battery having a high level of safety and outstanding high-temperature storability, a heat-resistant porous film capable of serving as a separator material for separating positive and negative electrodes from each other and capable of forming the nonaqueous battery, and a separator capable of forming the nonaqueous battery.

Means for Solving Problem

In order to achieve the above object, the heat-resistant porous film of the present invention is a heat-resistant porous film formed on a porous base material for forming a separator for a nonaqueous battery or on an electrode used in a nonaqueous battery. The heat-resistant porous film includes at least an organic binder and fine particles having a heat-resistant temperature of 130° C. or higher, as the organic binder, the heat-resistant porous film includes a polymer having a backbone derived from a polymeric double bond and a group having a cyclic structure including an amide bond, the polymer having a glass transition temperature of 130° C. or higher and a weight-average molecular weight of 350,000 or more, and the 180° peel strength between the heat-resistant porous film and the porous base material or the electrode is 0.6 N/cm or more.

Further, the separator for a nonaqueous battery of the present invention is a separator in which a porous base material and the heat-resistant porous film of the present invention are integrated with each other.

Furthermore, the nonaqueous battery of the present invention is a battery including a positive electrode, a negative electrode and a nonaqueous electrolyte, in which the heat-resistant porous film of the present invention is integrated with at least one of the positive electrode and the negative electrode, or is a battery including a positive electrode, a negative electrode, a separator and a nonaqueous electrolyte, in which the separator is the separator for a nonaqueous battery of the present invention.

Effects of the Invention

According to the present invention, it is possible to provide a nonaqueous battery having a high level of safety and outstanding high-temperature storability, a heat-resistant porous film capable of serving as a separator material for separating positive and negative electrodes from each other and capable of forming the nonaqueous battery, and a separator capable of forming the nonaqueous battery.

BRIEF DESCRIPTION OF DRAWINGS

FIG. 1 is a longitudinal sectional view for schematically showing one example of the nonaqueous battery of the present invention.

DESCRIPTION OF THE INVENTION

The heat-resistant porous film of the present invention contains at least an organic binder and fine particles having a heat-resistant temperature of 130° C. or higher, and it is suitable for use in a nonaqueous battery as a separator material for separating the positive electrode and the negative electrode from each other.

In other words, the heat-resistant porous film of the present invention acts as a separator for separating the positive electrode and the negative electrode from each other in the nonaqueous battery by, for example, being integrated with at least one of the positive electrode and the negative electrode of the nonaqueous battery and forms a separator for a nonaqueous battery as an independent film by being integrated with a porous base material.

The fine particles having a heat-resistant temperature of 130° C. or higher serve as the main component of the heat-resistant porous film of the present invention, and the organic binder binds the fine particles together as well as the heat-resistant porous film and an electrode or a porous base material to be integrated with the heat-resistant porous film together.

The 180° peel strength between the heat-resistant porous film of the present invention and a porous base material or an electrode of a nonaqueous battery to be integrated with the heat-resistant porous film is 0.6 N/cm or more, and preferably 1.0 N/cm or more. Even if a porous base material is made of a material that can shrink easily by heat, the heat-resistant porous film can act to suppress the shrinkage of the porous base material when the peel strength between the heat-resistant porous film and the porous base material meets the range of the above-mentioned values, so that the separator as a whole having the heat-resistant porous film and the porous base material (the separator for a nonaqueous battery of the present invention) is prevented from thermal shrinkage. Therefore, it is possible to improve the safety of the battery using this separator (i.e., the nonaqueous battery of the present invention) in the event of abnormal overheating. Also, when the peel strength between the heat-resistant porous film and the electrode meets the range of the above-mentioned values, the heat-resistant porous film that serves as a separator material for separating the positive electrode and the negative electrode from each other is prevented from shrinking, breakage, etc., even when the battery is abnormally overheated. Thus, it is possible to improve the safety of the battery using the heat-resistant porous film integrated with the electrode (i.e., the nonaqueous battery of the present invention) in the event of abnormal overheating.

The peel strength as used herein is a value determined by the following method. First, a test piece having a size of 5 cm in length and 2 cm in width is cut from a laminated composite of the heat-resistant porous film and a porous base material or a laminated composite of the heat-resistant porous film and an electrode, and an adhesive tape is adhered to a 2 cm×2 cm area on the surface of the heat-resistant porous film of the test piece. The size of the adhesive tape is 2 cm in width and about 5 cm in length, and the adhesive tape is adhered to the test piece such that one end of the adhesive tape aligns with one end of the heat-resistant porous film. Subsequently, the end of the test piece to which the adhesive tape is not adhered and the other end of the adhesive tape (the side opposite to the end that is adhered to the test piece) are held by a tensile tester and they are pulled at a tensile rate of 10 mm/min, and the strength at which the heat-resistant porous film comes off is measured.

The 180° peel strength between the heat-resistant porous film and a porous base material or an electrode meeting the range of the above-mentioned values can be achieved by configuring the heat-resistant porous film as follows.

As the organic binder, the heat-resistant porous film of the present invention contains a polymer (A) having a backbone derived from a polymeric double bond and a group having a cyclic structure including an amide bond. The polymer (A) has a glass transition temperature (Tg) of 130° C. or higher and a weight-average molecular weight of 350,000 or more [hereinafter, may be simply referred to as the "polymer (A)"].

In order to improve the level of safety of a nonaqueous battery at high temperatures, it is important that a separator material interposed between the positive electrode and the negative electrode is resistant to shrinkage and prevents direct contact between the positive electrode and the negative electrode.

If the polymer (A) has a Tg of 130° C. or higher, the fine particles having a heat-resistant temperature of 130° C. or higher used in the heat-resistant porous film can be maintained in a solidly-fixed state and the heat-resistant porous film and an electrode or a porous base material can be maintained in a solidly-fixed state until the internal temperature of the battery reaches 130° C. Thus, since it is possible to prevent the heat-resistant porous film itself and the porous base material (e.g., a polyolefin microporous film) integrated with the heat-resistant porous film from shrinking, the nonaqueous battery having an excellent level of safety can be configured.

Tg of the polymer (A) as used herein is a value determined using a differential scanning calorimeter (DSC) in accordance with the regulations of JIS K 7121.

The polymer (A) has a weight-average molecular weight of 350,000 or more, preferably 400,000 or more, more preferably 1,000,000 or more, and even more preferably 1,500,000 or more. Generally, a polymer having a backbone derived from a polymeric double bond tends to have a higher Tg and higher adhesion with an increase in the molecular weight. Therefore, if the weight-average molecular weight is in the range of the above-mentioned values, the polymer (A) having a Tg in the range of the above-mentioned values can be achieved with ease. Further, the 180° peel strength between the heat-resistant porous film and a porous base material or an electrode can be adjusted to be in the range of the above-mentioned values with ease. Furthermore, by using the polymer (A) whose weight-average molecular weight meets the range of the above-mentioned values as the organic binder, decomposition of the polymer (A) in a battery can be suppressed. Thus, it is also possible to improve the high-temperature storability of the nonaqueous battery using the heat-resistant porous film.

As will be explained later, it is preferable that the heat-resistant porous film is formed through the application of a heat-resistant porous film forming composition (paint) prepared by, for example, dissolving the organic binder in a solvent. However, if the weight-average molecular weight of the polymer (A) is too large, the viscosity of the composition could increase, so that the applicability of the composition may deteriorate. Therefore, the weight-average molecular weight of the polymer (A) is preferably 20,000,000 or less, more preferably 10,000,000 or less, even more preferably 4,000,000 or less, and particularly preferably 3,500,000 or less.

The weight-average molecular weight of the polymer (A) as used herein is a weight-average molecular weight (polystyrene equivalent) determined by gel permeation chromatography.

The polymer (A) used as the organic binder includes a backbone derived from a polymeric double bond and a group having a cyclic structure including an amide bond and has favorable adhesion to the fine particles having a heat-resistant temperature of 130° C. or higher, in addition to having a large tensile strength and a large modulus of elongation. Thus, by using the polymer (A) having such a structure whose Tg and weight-average molecular weight are as described above, the heat-resistant porous film having excellent heat resistance can be formed and the peel strength between the heat-resistant porous film and a porous base material can meet the range of the above-mentioned values.

As long as a backbone derived from a polymeric double bond and a group having a cyclic structure including an amide bond are included in at least part of the polymer (A), the polymer (A) can be a homopolymer or co-polymer obtained by the polymerization of monomers that have a polymeric double bond and a group having a cyclic structure including an amide bond. The monomers used to form the polymer (A) may have only one or more than one group having a cyclic structure including an amide bond. It is more preferable that the group having a cyclic structure including an amide bond is a group represented by the following chemical formula (1).

[Chemical Formula 1]

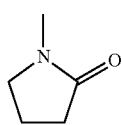

(1)

Specific examples of the polymer (A) include: homopolymers of monomers that have a polymeric double bond and a group having a cyclic structure including an amide bond, such as poly(N-vinylcaprolactam) (a homopolymer of N-vinylcaprolactam) and polyvinyl pyrrolidone (PVP; a homopolymer of vinylpyrrolidone); copolymers of two or more kinds of monomers that have a polymeric double bond and a group having a cyclic structure including an amide bond (such as N-vinylcaprolactam and vinylpyrrolidone); and copolymers of one or more kinds of monomers that have a polymeric double bond and a group having a cyclic structure including an amide bond (such as N-vinylcaprolactam and vinylpyrrolidone) and one or more kinds of other monomers that have a polymeric double bond (i.e., monomers other than those having a polymeric double bond and a group having a cyclic structure including an amide bond).

Examples of the above-mentioned other monomers, which include a polymeric double bond and may be used to form co-polymers with the monomers having a polymeric double bond and a group having a cyclic structure including an amide bond, include vinyl noncyclic amides, (meth)acrylic acid and esters thereof, (meth)acryl amides and derivatives thereof [the meaning of the term "(meth)acryl amides" includes both acryl and methacryl amides], styrene and derivatives thereof, vinylesters such as vinyl acetate, α-olefines, unsaturated basic compounds, such as vinylimidazole and vinylpyridine, and derivatives thereof, carboxylic group-containing unsaturated compounds and acid anhydrides thereof, vinyl sulfonic acid and derivatives thereof, vinylethylene carbonate and derivatives thereof and vinylethers.

In a copolymer of a monomer that has a polymeric double bond and a group having a cyclic structure including an amide bond and other monomer having a polymeric double bond, the content of unit derived from the monomer having a polymeric double bond and a group having a cyclic structure including an amide bond is preferably 40 mol % or more, more preferably 60 mol % or more, and still more preferably 80 mol % or more of the total of units (100 mol %) derived from the monomers of the copolymer, because this makes the properties such as Tg and the peel strength readily adjustable within the ranges of the above-mentioned values.

Further, in the heat-resistant porous film of the present invention, one or two or more of resins such as an ethylene-vinyl acetate copolymer (EVA; one having 20 to 35 mol % of a structural unit derived from vinyl acetate), a (meth)acrylate polymer [the meaning of the term "(meth)acrylate" include acrylate and methacrylate], fluororubber, styrene butadiene rubber (SBR) and polyurethane may be used as additional organic binders in combination with the above-described polymer.

The organic binder content in the heat-resistant porous film is preferably 0.5 vol % or more of the total volume of the heat-resistant porous film components (the total volume exclusive of pores; the same goes for the content of each component of the heat-resistant porous film) in terms of allowing the organic binder(s) to act favorably to make, for example, the 180° peel strength between the heat-resistant porous film and a porous base material or an electrode readily adjustable within the range of the above-mentioned values. Since the heat-resistant porous film of the present invention uses the polymer (A) as the organic binder, the adhesion of the heat-resistant porous film to a porous base material or an electrode can be improved even with a small organic binder content in the heat-resistant porous film as above, so that the peel strength between the heat-resistant porous film and a porous base material or an electrode can be adjusted within the range of the above-mentioned values.

On the other hand, if the organic binder content in the heat-resistant porous film is too large, the content of other components (such as the fine particles having a heat-resistant temperature of 130° C. or higher) is reduced, so that the effects resulting from these other components may be weakened. Therefore, the organic binder content in the heat-resistant porous film is preferably 20 vol % or less, more preferably 15 vol % or less, and still more preferably 10 vol % or less of the total volume of the heat-resistant porous film components.

Since the fine particles having a heat-resistant temperature of 130° C. or higher as used in the heat-resistant porous film serve as the main component of the heat-resistant porous film and voids in a fibrous material (described later) are filled with them, they have the effect of suppressing the occurrence of shorting resulting from lithium dendrites. The term "heat-resistant temperature of 130° C. or higher" as used herein in connection with the fine particles having a heat-resistant temperature of 130° C. or higher means that no change in shape, such as deformation, can be visually observed at least at 130° C. The heat-resistant temperature of the fine particles is more preferably 150° C. or higher.

The fine particles having a heat-resistant temperature of 130° C. or higher are not particularly limited as long as they have electric insulation and electrochemical stability, and are further stable against a nonaqueous electrolyte (nonaqueous electrolytic solution) included in a battery and a solvent used for a heat-resistant porous film forming composition (composition containing a solvent). The term "stable against a nonaqueous electrolyte" as used herein means that no deformation and chemical compositional change occur in a nonaqueous electrolyte used in a nonaqueous battery. Further, the term "electrochemical stability" as used herein means that no chemical change occurs when a battery is charged/discharged.

Specific examples of the fine particles having a heat-resistant temperature of 130° C. or higher as above include inorganic fine particles such as the following: fine particles of oxides such as iron oxide, $SiO_2$, $Al_2O_3$, $TiO_2$, $BaTiO_3$, and $ZrO_2$; fine particles of nitrides such as aluminum nitride and silicon nitride; fine particles of hardly-soluble ionic crystals such as calcium fluoride, barium fluoride and barium sulfate; fine particles of covalent crystals such as silicon and diamond; fine particles of clays such as talc and montmorillonite; fine particles of materials derived from mineral resources such as boehmite, zeolite, apatite, kaoline, mullite, spinel, olivine, sericite, bentonite, and hydrotalcite and artificial products thereof. Further, fine particles provided with electric insulation by surface-treating conductive fine particles, such as metal fine particles; oxide fine particles such as $SnO_2$ and tin-indium oxide (ITO), or carbonaceous fine particles such as carbon black and graphite, with an electrically insulative material (e.g., a material forming the insulative fine particles having electric insulation) may also be used.

Organic fine particles can also be used as the fine particles having a heat-resistant temperature of 130° C. or higher. Specific examples of the organic fine particles include fine particles of the following: crosslinked polymers such as polyimide, melamine resins, phenol resins, crosslinked polymethyl methacrylate (crosslinked PMMA), crosslinked polystyrene (crosslinked PS), polydivinylbenzene (PDVB), and benzoguanamine-formaldehyde condensation products; and heat-resistant polymers such as thermoplastic polyimide. Each organic resin (polymer) forming these organic fine particles may be a mixture, a modified product, a derivative, a copolymer (a random copolymer, an alternating copolymer, a block copolymer, a graft copolymer), or a crosslinked product (in the case of the heat-resistant polymer) of the polymeric materials mentioned above.

As the fine particles having a heat-resistant temperature of 130° C. or higher, the various types of fine particles mentioned above may also be used alone or in combination of two or more. Further, the fine particles having a heat-resistant temperature of 130° C. or higher may be fine particles of two or more types of materials forming the various types of fine particles mentioned above. Among the various types of fine particles mentioned above, inorganic oxide fine particles are preferable, and alumina, silica, and boehmite are more preferable because, for example, the oxidation resistance of the heat-resistant porous film can be further enhanced.

The fine particles having a heat-resistant temperature of 130° C. or higher may be in any shape such as spherical, particulate or plate-like, but are preferably plate-like. Examples of plate-like particles include various commercially-available products such as "SUNLOVELY" ($SiO_2$) manufactured by AGC Si-Tech Co., Ltd., a pulverized product of "NST-B1" ($TiO_2$) manufactured by ISHIHARA SANGYO KAISHA LTD., plate-like barium sulfate "H Series" and "HL Series" manufactured by Sakai Chemical Industry Co., Ltd., "MICRON WHITE" (talc) manufactured by Hayashi Kasei Co., Ltd., "BEN-GEL" (bentonite) manufactured by Hayashi Kasei Co., Ltd., "BMM" and "BMT" (boehmite) manufactured by Kawai Lime Industrial, Co., Ltd., "CELASULE BMT-B" [alumina ($Al_2O_3$)] manufactured by Kawai Lime Industrial, Co., Ltd., "SERATH" (alumina) manufactured by KINSEI MATEC CO., LTD., and "HIKAWA MICA Z-20" (sericite) manufactured by Hikawa Kogyo Co., Ltd. In addition, $SiO_2$, $Al_2O_3$, $ZrO_2$ and $CeO_2$ can be produced by a method disclosed in JP 2003-206475 A.

When the fine particles having a heat-resistant temperature of 130° C. or higher are plate-like, it is preferable that the fine particles in the heat-resistant porous film are oriented such that the flat plate surface of each fine particle is substantially parallel to the surface of the heat-resistant porous film. The occurrence of shorting in the battery can be suppressed more favorably by using such a heat-resistant porous film, and the reasons are considered as follows. By orienting the fine particles having a heat-resistant temperature of 130° C. or higher in the above manner, the fine particles will be disposed with their plate surfaces being partially overlapped with one another. Thus, each pore (through hole) going from one side to the other of the heat-resistant porous film is formed in a curve rather than a line (i.e., an increase in tortuosity factor of the pores). Since this can prevent lithium dendrites from passing through the heat-resistant porous film, the occurrence of shorting is believed to be suppressed more favorably.

When the fine particles having a heat-resistant temperature of 130° C. or higher are plate-like particles, it is preferable that they each have, for example, an aspect ratio (the ratio of the maximum length to the thickness of plate-like particle) of 5 or more, and more preferably 10 or more, and preferably 100 or less, and more preferably 50 or less. The average of the ratios between longer and shorter sides of plate surfaces of the particle is preferably 0.3 or more, and more preferably 0.5 or more (and may also be 1, i.e., the longer side and the shorter side may be the same). When the fine particles having a heat-resistant temperature of 130° C. or higher are plate-like particles having an aspect ratio as described above and the average of the ratios between longer and shorter sides of plate surfaces is as above, the effect of preventing shorting can be produced more effectively.

When the fine particles having a heat-resistant temperature of 130° C. or higher are plate-like, the average of the ratios between longer and shorter sides of the plate surfaces can be determined, for example, by analyzing scanning electron microscope (SEM) images. Further, when the fine particles having a heat-resistant temperature of 130° C. or higher are plate-like, the aspect ratio also can be determined by analyzing SEM images.

When the fine particles having a heat-resistant temperature of 130° C. or higher are too small, it may become difficult to adjust the 180° peel strength between the heat-resistant porous film and a porous base material or an electrode to be within the range of the above-mentioned values. Therefore, the fine particles having a heat-resistant temperature of 130° C. or higher have an average particle size of preferably 0.01 μm or more, and more preferably 0.1 μm or more. However, if the fine particles having a heat-resistant temperature of 130° C. or higher are too large, the heat-resistant porous film becomes too thick, and the energy density of the battery using the heat-resistant porous film thus may decline, for example. Therefore, the fine particles having a heat-resistant temperature of 130° C. or higher have an average particle size of 15 μm or less, and preferably 5 μm or less.

The average particle size of the fine particles having a heat-resistant temperature of 130° C. or higher as used herein can be defined as a number-average particle size measured with, for example, a laser diffraction particle size analyzer (e.g., "LA-920" manufactured by HORIBA, Ltd.) by dissolving the fine particles having a heat-resistant temperature of 130° C. or higher in a medium or by dispersing the fine particles having a heat-resistant temperature of 130° C. or higher in a medium in which the fine particles having a heat-resistant temperature of 130° C. or higher do not swell.

Further, the fine particles having a heat-resistant temperature of 130° C. or higher have a specific surface area of preferably 100 $m^2/g$ or less, more preferably 50 $m^2/g$ or less, and still more preferably 30 $m^2/g$ or less. When the fine particles having a heat-resistant temperature of 130° C. or higher have a large specific surface area, generally, the organic binder for favorably binding the fine particles together and binding the fine particles and a base material or an electrode together tends to be required more. This may cause a battery, when being formed, to have poor output characteristics. Further, when the fine particles having a heat-resistant temperature of 130° C. or higher have a large specific surface area, moisture adsorbed onto the fine particle surface increases, which may deteriorate the battery characteristics of the nonaqueous battery. On the other hand, it is preferable that the fine particles having a heat-resistant temperature of 130° C. or higher have a specific surface area of 1 $m^2/g$ or more. The specific surface area of the fine particles having a heat-resistant temperature of 130° C. or higher as used herein refers to a value determined by the BET method using nitrogen gas.

Further, since the fine particles used in the heat-resistant porous film of the present invention are highly heat-resistant as they have a heat-resistant temperature of 130° C. or higher, the heat-resistant porous film shrinks less at high temperatures and has outstanding size stability by the action of the fine particles. Furthermore, when the heat-resistant porous film having outstanding heat resistance as described above is integrated with an electrode (a positive electrode and/or a negative electrode), the size stability of the heat-resistant porous film as a whole at high temperatures further improves. On the other hand, the separator for a nonaqueous battery of the present invention includes a porous base material and the heat-resistant porous film of the present invention integrated with the porous base material. Thus, even if the porous base material has poor size stability at high temperatures such as, for example, a polyolefin microporous film, since the porous base material is integrated with the heat-resistant porous film having favorable size stability at high temperatures by the action of the fine particles having a heat-resistant temperature of 130° C. or higher, thermal shrinkage of the porous base material is suppressed, and the size stability of the separator as a whole thus improves. Therefore, in the nonaqueous battery having the heat-resistant porous film of the present invention integrated with an electrode or in the nonaqueous battery having the separator for a nonaqueous battery of the present invention, the occurrence of shorting resulting from thermal shrinkage of a separator as in, for example, a battery using a separator composed only of a conventional polyethylene microporous film can be prevented, so that the level of reliability and safety in the event of abnormal overheating in the battery can be further improved.

Further, in the nonaqueous battery having the heat-resistant porous film of the present invention (the nonaqueous battery of the present invention), shorting resulting from thermal shrinkage of a separator at high temperatures can be prevented by means other than, for example, increasing the thickness of the separator. Therefore, the separator material for separating positive and negative electrodes from each other (the heat-resistant porous film of the present invention or the separator for a nonaqueous battery of the present invention) can have a relatively small thickness, so that a decline in the energy density can be suppressed as much as possible.

In terms of providing the effects resulting from the use of the fine particles having a heat-resistant temperature of 130° C. or higher more effectively, the amount of the fine particles in the heat-resistant porous film is preferably 10 vol % or more, more preferably 30 vol % or more, and still more preferably 40 vol % or more of the total volume of the heat-resistant porous film components.

When providing the heat-resistant porous film containing no fibrous material (described later) with the shutdown function by incorporating thermofusible fine particles and swellable fine particles (both of which will be described later) in the heat-resistant porous film, the amount of the fine particles having a heat-resistant temperature of 130° C. or higher in the heat-resistant porous film is preferably, for example, 80 vol % or less of the total volume of the heat-resistant porous film components. Further, when not providing the heat-resistant porous film containing no fibrous material (described later) with the shutdown function, the amount of the fine particles having a heat-resistant temperature of 130° C. or higher in the heat-resistant porous film may be larger than the above-mentioned amount. Specifically, the amount of the fine particles having a heat-resistant temperature of 130° C. or higher may be 99.5 vol % or less of the total volume of the heat-resistant porous film components.

On the other hand, when providing the heat-resistant porous film containing the later-described fibrous material with the shutdown function by incorporating thermofusible fine particles and swellable fine particles (both of which will be described later) in the heat-resistant porous film, the amount of fine particles having a heat-resistant temperature of 130° C. or higher in the heat-resistant porous film is preferably, for example, 70 vol % or less of the total volume of the heat-resistant porous film components. Further, when not providing the heat-resistant porous film containing the later-described fibrous material with the shutdown function, the amount of the fine particles having a heat-resistant temperature of 130° C. or higher in the heat-resistant porous film may be larger than the above-mentioned amount. Specifically, the amount of fine particles having a heat-resistant temperature of 130° C. or higher may be 80 vol % or less of the total volume of the heat-resistant porous film components.

The heat-resistant porous film may contain a fibrous material. By incorporating the fibrous material in the heat-resistant porous film, the heat-resistant porous film can have enhanced strength. The term "fibrous material" as used herein refers to one having an aspect ratio [longitudinal length/width in the direction perpendicular to the longitudinal direction (diameter)] of 4 or more. It is preferable that the aspect ratio of the fibrous material is 10 or more.

It is preferable that the fibrous material has a heat-resistant temperature of 150° C. or higher. For example, in the case where the heat-resistant porous film includes a material capable of providing a function of blocking the movement of ions in the heat-resistant porous film (the so-called shutdown function) by being melted at a temperature of 140° C. or lower to close the pores in the heat-resistant porous film (described later in detail), if the temperature of the separator additionally rises by 10° C. or more after the occurrence of shutdown due to, for example, heat generation in a battery, the shape of the heat-resistant porous film can be maintained more stably when the fibrous material having a heat-resistant temperature of 150° C. or higher is also included in the porous film. On the other hand, even when the heat-resistant porous film using the fibrous material having a heat-resistant temperature of 150° C. or higher or the separator using this heat-resistant porous film is not provided with the shutdown function, deformation thereof can be substantially avoided at a temperature of 150° C.

The term "heat-resistant temperature of 150° C. or higher" as used herein in connection with the fibrous material having a heat-resistant temperature of 150° C. or higher means that no change in shape, such as deformation, can be visually observed at least at 150° C.

The fibrous material is not particularly limited as long as it is electrically insulative, has a heat-resistant temperature of preferably 150° C. or higher and electrochemical stability, and is further stable against a nonaqueous electrolyte (nonaqueous electrolytic solution) included in a nonaqueous battery and a solvent used for a heat-resistant porous film forming composition.

Specific examples of fibrous material components include: resins such as cellulose and cellulose modified products (such as carboxymethyl cellulose), polypropylene (PP), polyesters [such as polyethylene terephthalate (PET), polyethylene naphthalate (PEN) and polybutylene terephthalate (PBT)], polyacrylonitrile (PAN), aramid, polyamideimide and polyimide; and inorganic materials (inorganic oxides) such as glass, alumina and silica. The fibrous material may contain one of or two or more of these components. In addition to the above-mentioned components, the fibrous material may also contain a variety of known additives (e.g., an antioxidant, etc. in the case of a resin fibrous material) as needed as ingredients.

In order to improve the adhesion of the fibrous material to the fine particles having a heat-resistant temperature of 130° C. or higher, the fibrous material may be surface treated, for example, with a corona discharge or with a surfactant.

The diameter of the fibrous material may be equal to or smaller than the thickness of the heat-resistant porous film but is preferably, for example, 0.01 to 5 µm. If the diameter is too large, entanglement of the fibrous material becomes insufficient. Thus, for example, the effect of enhancing the strength of the heat-resistant porous film resulting from the use of the fibrous material may be weakened. Further, if the diameter is too small, the pores in the heat-resistant porous film become too small, and the ion permeability thus tends to decline. This may impair the load characteristics of the battery.

The fibrous material is preferably present in the heat-resistant porous film such that the angle between the surface of the heat-resistant porous film and the longitudinal axis (the axis in the longitudinal direction) of the fibrous material is 30° or less on average, and more preferably 20° or less on average.

When the heat-resistant porous film contains the fibrous material, the fibrous material content in the heat-resistant porous film is preferably 10 vol % or more, and more preferably 30 vol % or more of the total volume of the heat-resistant porous film components in terms of providing the effects resulting the use of the fibrous material more effectively. On the other hand, when the fibrous material content in the heat-resistant porous film containing the fibrous material is too large, the content of other components (such as the fine particles having a heat-resistant temperature of 130° C. or higher) is reduced, so that the effects resulting from these other components may be weakened. Therefore, the fibrous material content is preferably 90 vol % or less, and more preferably 70 vol % or less of the total volume of the heat-resistant porous film components.

It is possible to impart the shutdown function to the heat-resistant porous film of the present invention. A method that can be adopted to provide the heat-resistant porous film with the shutdown function includes incorporating in the heat-resistant porous film, for example, thermofusible fine particles that melt at a temperature of 80 to 150° C. or swellable fine particles that swell at a temperature of 80 to 150° C. due to an increase in the amount of nonaqueous electrolyte absorbed by the swellable fine particles. The term "increase in the amount of nonaqueous electrolyte absorbed by the swellable fine particles" as used herein means that the absorption amount per 1 g of resin becomes 1.0 mL/g or more.

Note that the shutdown function of the heat-resistant porous film can be evaluated, for example, by an increase in resistance with the temperature of a model cell. That is, the model cell including a positive electrode, a negative electrode, the heat-resistant porous film (integrated with one of the positive electrode and the negative electrode), and a nonaqueous electrolyte is produced. Then, this model cell is placed in a thermostatic oven, and the internal resistance value of the model cell is measured while the temperature is raised at a rate of 5° C./min. By determining the temperature at which the measured internal resistance value is at least five times as large as that before heating (i.e., the resistance value measured at room temperature), this temperature can be evaluated as the shutdown temperature of the heat-resistant porous film.

When the heat-resistant porous film containing thermofusible fine particles meltable at 80 to 150° C., i.e., thermofusible fine particles whose melting temperature measured with a differential scanning calorimeter (DSC) in accordance with the regulations of JIS K 7121 is 80 to 150° C. is exposed to a temperature of 80 to 150° C. (or higher), the thermofusible fine particles melt and close the pores in the heat-resistant porous film, thereby interfering with the movement of Li ions. Thus, in the nonaqueous battery using such a heat-resistant porous film as a separator material for separating the positive electrode and the negative electrode from each other, an abrupt discharge reaction at high temperatures can be prevented. In this case, the shutdown temperature of the separator evaluated on the basis of an increase in internal resistance as above becomes equal to or higher than the melting point of the thermofusible fine particles and equal to or lower than 150° C. The melting point (the melting temperature) of the thermofusible fine particles is more preferably 140° C. or lower.

Specific examples of thermofusible fine particle components include polyethylene (PE), a copolymerized polyolefin having 85 mol % or more of structural unit derived from ethylene, PP, or polyolefin derivatives (such as chlorinated polyethylene and chlorinated polypropylene), a polyolefin wax, a petroleum wax, and a carnauba wax. The copolymerized polyolefin may be, for example, an ethylene-vinyl monomer copolymer, and more specifically, an ethylene-vinyl acetate copolymer (EVA), an ethylene-methyl acrylate copolymer, or an ethylene-ethyl acrylate copolymer. Further, polycycloolefin, etc. can also be used. The thermofusible fine particles may include only one kind of or two or more kinds of these components. Among these components, PE, polyolefin wax, or EVA having 85 mol % or more of structural unit derived from ethylene is suitable. Further, in addition to the above-mentioned components, the thermofusible fine particles may also contain a variety of known additives (e.g., antioxidant) to resins as needed as ingredients.

The particle size of the thermofusible fine particles is preferably, for example, 0.001 μm or more, and more preferably 0.1 μm or more, and preferably 15 μm or less, and more preferably 1 μm or less in number-average particle size, the number-average particle size being measured by the same measurement method as in the case of the fine particles having a heat-resistant temperature of 130° C. or higher.

When the heat-resistant porous film having swellable fine particles that swell at a temperature of 80 to 150° C. due to an increase in the amount of nonaqueous electrolyte absorbed by the swellable fine particles is exposed to a high temperature in a battery, the amount of nonaqueous electrolyte absorbed by the swellable fine particles increases and the swellable fine particles swell significantly (hereinafter, the swellable fine particles' function of absorbing a nonaqueous electrolyte with an increase in temperature and swelling significantly is referred to as the "heat swelling property"), thereby significantly weakening the conductivity of Li ions in the heat-resistant porous film. Consequently, the internal resistance of the battery rises, so that the shutdown function can be ensured with certainty. The temperature at which the swellable fine particles start to show their heat swelling property is 80° C. or higher and 150° C. or lower but is more preferably 135° C. or lower.

Suitable examples of the swellable fine particles having such a heat swelling property include crosslinked polystyrene (PS), crosslinked acrylic resins [e.g., crosslinked polymethyl methacrylate (PMMA)], crosslinked fluororesins [e.g., crosslinked polyvinylidene fluoride (PVDF)] and the like, and crosslinked PMMA is particularly preferred.

The particle size of the swellable fine particles is preferably 0.1 to 20 μm in number-average particle size, the number-average particle size being measured with a laser diffraction particle size analyzer (e.g., "LA-920" manufactured by HORIBA, Ltd.) by dispersing the fine particles in a medium (e.g., water) in which the fine particles do not swell.

Examples of commercially-available swellable fine particles include crosslinked PMMA "GANZ PEARL (trade name)" manufactured by Ganz Chemical Co., Ltd., and crosslinked PMMA "RSP1079 (trade name)" manufactured by Toyo Ink Co., Ltd.

To provide the heat-resistant porous film with the shutdown function, only the thermofusible fine particles, only the swellable fine particles, or both the thermofusible fine particles and the swellable fine particles may be incorporated in the heat-resistant porous film. Further, composite fine particles of a thermofusible fine particle component and a swellable fine particle component, such as core-shell fine particles in which the swellable fine particles serving as the core are coated with the thermofusible fine particle component on the surface, may also be incorporated in the heat-resistant porous film.

When providing the heat-resistant porous film with the shutdown function by incorporating the thermofusible fine particles and/or the swellable fine particles in the heat-resistant porous film, the content of thermofusible fine particles or swellable fine particles in the heat-resistant porous film (when the heat-resistant porous film contains both the thermofusible fine particles and the swellable fine particles, the content refers to the total of both particles; and when the heat-resistant porous film contains composite fine particles of a thermofusible fine particle component and a swellable fine particle component, the content refers to the amount of composite fine particles) is preferably 5 to 70 vol % of the total volume of the heat-resistant porous film components in terms of ensuring that the shutdown function is provided favorably. If the content of these fine particles is too small, the shutdown effect resulting from the incorporation of these fine particles may be weakened. On the other hand, if the content of these fine particles is too large, for example, the content of fine particles having a heat-resistant temperature of 130° C. or higher and that of fibrous material is reduced, so that the effects ensured by these components may be weakened.

Examples of specific forms of the heat-resistant porous film of the present invention include the following forms (a), (b) and (c).

(a) The heat-resistant porous film in the form of a sheet, in which the fine particles having a heat-resistant temperature of 130° C. or higher (and other fine particles as needed) are bound together by the organic binder to form the heat-resistant porous film (b) The heat-resistant porous film in the form of a sheet, in which the fine particles having a heat-resistant temperature of 130° C. or higher (and further other fine particles as needed) and the fibrous material are evenly distributed and they are bound together by the organic binder to form the heat-resistant porous film (c) The monolayer heat-resistant porous film formed by incorporating the fine particles having a heat-resistant temperature of 130° C. or higher and other fine particles as needed in the fibrous material in the form of a sheet-like product, for example, a piece of woven fabric, nonwoven fabric (including paper) or the like composed solely of a cluster of the fibrous material, and binding the fibrous material of the sheet-like product and the various fine particles together by the organic binder The heat-resistant porous film in any of these forms is integrated with an electrode (a positive electrode and/or a negative electrode) used in a nonaqueous battery and is used as a separator material for separating the positive electrode and the negative electrode from each other.

Thus, a method that can be adopted to form the heat-resistant porous film of the present invention, for example, in the form (a) or (b) and to combine the heat-resistant porous film with an electrode includes dispersing in a solvent (including a dispersion medium; the same goes for the following) the fine particles having a heat-resistant temperature of 130° C. or higher and the organic binder, and further the fibrous material and other fine particles as needed to prepare a heat-resistant porous film forming composition (the organic binder may be dissolved in the solvent), applying the composition onto the surface of the electrode, and drying the applied composition to form the heat-resistant porous film directly on the surface of the electrode.

Further, the heat-resistant porous film may be integrated with an electrode by applying the heat-resistant porous film forming composition to a base material such as a PET film or a metal plate, drying the applied composition to form the heat-resistant porous film in the form (a) or (b), removing the porous film from the base material, placing the porous film over the electrode, and roll-pressing the porous film and the electrode.

Further, the heat-resistant porous film in the form (c) can be formed by impregnating the fibrous material in the form of a sheet-like product with the heat-resistant porous film forming composition, passing the fibrous material through a certain gap to remove the undesired composition, and drying the fibrous material to obtain the heat-resistant porous film in the form of an independent film. Then, the heat-resistant porous film is placed over an electrode and they are integrated with each other using, for example, a roll press.

Examples of the fibrous material in the form of a sheet-like product used in the heat-resistant porous film in the form (c) include porous sheets such as woven fabric composed of at least one fibrous material containing any of the above-mentioned materials as a component, and nonwoven fabric having a structure in which the fibrous material is entangled together. More specific examples include nonwoven fabrics such as paper, PP nonwoven fabric, polyester nonwoven fabrics (such as PET nonwoven fabric, PEN nonwoven fabric, and PBT nonwoven fabric), and PAN nonwoven fabric.

The solvent used to form the heat-resistant porous film forming composition may be any solvent in which the fine particles having a heat-resistant temperature of 130° C. or higher, the thermofusible fine particles, the swellable fine particles and the like can be dispersed uniformly and the organic binder can be dissolved or dispersed uniformly but is suitably an organic solvent. Examples of such an organic solvent include: aromatic hydrocarbons such as toluene; furans such as tetrahydrofuran; and ketones such as methyl ethyl ketone and methyl isobutyl ketone. To these solvents, alcohols (such as ethylene glycol and propylene glycol) or a variety of propylene oxide glycol ethers such as monomethyl acetate may be added as appropriate for the purpose of controlling the interfacial tension. Further, when the binder is water-soluble or the binder is used in the form of an emulsion, water may be used as the solvent. Also in this case, alcohols (such as methyl alcohol, ethyl alcohol, isopropyl alcohol, and ethylene glycol) can be added to the solvent as appropriate to control the interfacial tension.

It is preferable that the heat-resistant porous film forming composition has a solid content (including the fine particles having a heat-resistant temperature of 130° C. or higher, the organic binder, the thermofusible fine particles, the swellable fine particles, the fibrous material, etc) of, for example, 10 to 80 mass %.

When using plate-like particles as the fine particles having a heat-resistant temperature of 130° C. or higher, in order to improve the orientation of the plate-like particles in the heat-resistant porous film, shear may be applied to the composition in a coating (coating before being dried) formed by applying the heat-resistant porous film forming composition onto the surface of an electrode or onto the surface of other base material or in a sheet-like product impregnated with the heat-resistant porous film forming composition. For example, it is possible to apply shear to the heat-resistant porous film forming composition by the method of impregnating the sheet-like product with the heat-resistant porous film forming composition and then passing the sheet-like product through a certain gap described above as the method for allowing the fine particles having a heat-resistant temperature of 130° C. or higher, etc. to be present in the pores in the sheet-like product. This can improve the orientation of the plate-like particles.

In addition to shearing as described above, the orientation of the plate-like fine particles having a heat-resistant temperature of 130° C. or higher in the heat-resistant porous film can be further improved, for example, by the following methods: a method of using the heat-resistant porous film forming composition that has a high solid concentration (e.g., 50 to 80 mass %); a method of using the heat-resistant porous film forming composition that is prepared by dispersing the fine particles having a heat-resistant temperature of 130° C. or higher in a solvent with various types of mixing and stirring devices such as a disperser, an agitator, a homogenizer, a ball mill, an attritor, and a jet mill and mixing the organic binder (and further the fibrous material, the thermofusible fine particles, the swellable fine particle and the like as needed) with the dispersion thus obtained; a method of using the heat-resistant porous film forming composition prepared by using the fine particles having a heat-resistant temperature of 130° C. or higher whose surfaces have been modified by the action of dispersing agents such as fats and oils, a surfactant, and a silane coupling agent; a method of using the heat-resistant porous film forming composition prepared by using the fine particles having a heat-resistant temperature of 130° C. or higher with different shapes, diameters, or aspect ratios; a method of controlling the dry conditions after the heat-resistant porous film forming composition is applied to a base material or a sheet-like product is impregnated with the heat-resistant porous film forming composition; a method of pressing the heat-resistant porous film by applying pressure or applying heat and pressure; and a method of applying a magnetic field, after applying the heat-resistant porous film forming composition to a base material or impregnating a sheet-like product with the heat-resistant porous film forming composition, to the base material or the sheet material before drying. These methods may be performed individually or in combinations of two or more.

The heat-resistant porous film thus obtained has a thickness of preferably 3 μm or more, and more preferably 5 μm or more, for example, in terms of enhancing the strength of the heat-resistant porous film and further increasing the effect of preventing shorting in the battery in which the heat-resistant porous film is used. On the other hand, in terms of further increasing the energy density of the battery, the heat-resistant porous film has a thickness of preferably 50 μm or less, and more preferably 30 μm or less.

Further, in order to ensure the amount of nonaqueous electrolyte retained in the heat-resistant porous film to improve the ion permeability of the heat-resistant porous film, the porosity of the heat-resistant porous film is preferably 20% or more, and more preferably 30% or more in a dry state. On the other hand, in terms of ensuring the heat-resistant porous film the strength and preventing internal shorting in the battery, the porosity of the heat-resistant porous film is preferably 70% or less, and more preferably 60% or less in a dry state. The porosity: P (%) of the heat-resistant porous film can be calculated by obtaining the total sum of respective components i using Formula (2) below from the thickness and the mass per area of the heat-resistant porous film, and the density of the components.

$$P=\{1-(m/t)/(\Sigma a_i \rho_i)\} \times 100 \quad (2)$$

Where, $a_i$ is the ratio of component i to the total mass, where the total mass is taken as 1, $\rho_i$ is the density (g/cm$^3$) of the components i, m is the mass per unit area (g/cm$^2$) of the heat-resistant porous film, and t is the thickness (cm) of the heat-resistant porous film.

Furthermore, it is preferable that the heat shrinkage of the heat-resistant porous film is 5% or less at 150° C. (in a state of being integrated with an electrode), the heat shrinkage being determined by a method later described in Examples.

Further, it is desirable that the heat-resistant porous film has a strength of 50 g or more, the strength being a piercing strength obtained using a needle having a diameter of 1 mm. If the piercing strength is too small, shorting may occur when lithium dendrite crystals develop and penetrate through the heat-resistant porous film.

Moreover, it is desirable that the heat-resistant porous film has an air permeability of 10 to 300 sec, which is indicated by a Gurley value. The Gurley value is obtained by a method according to JIS P 8117 and expressed as the length of time (seconds) it takes for 100 mL air to pass through a membrane at a pressure of 0.879 g/mm$^2$. If the air permeability is too large, the ion permeability can be reduced. If the air permeability is too small, the strength of the heat-resistant porous film may be reduced.

By configuring the heat-resistant porous film as explained thus far, it is possible to ensure the heat-resistant porous film the thermal shrinkage, the strength and the air permeability as described above.

The separator for a nonaqueous battery of the present invention has a multilayered structure composed of a porous base material and the heat-resistant porous film of the present invention integrated with the porous base material.

As the porous base material used in the separator, a piece of nonwoven fabric or woven fabric made of resin, a microporous resin film or the like can be used.

When imparting the shutdown function to the separator of the present invention, it is preferable to use a thermoplastic resin having a melting point of 80 to 150° C. as the constituent resin of the porous base material. Examples of thermoplastic resins having a melting point of 80 to 150° C. include a variety of thermoplastic resins mentioned above as the examples of constituent resins of thermofusible fine particles. Among porous base materials made of such thermoplastic resins, a polyolefin (such as PE or an ethylene-propylene copolymer) microporous film is preferred.

As in the case of the shutdown function of the heat-resistant microporous film, the shutdown function of the separator of the present invention can also be evaluated by an increase in resistance with the temperature of a model cell. That is, the model cell including a positive electrode, a negative electrode, the separator, and a nonaqueous electrolyte is prepared. Then, this model cell is placed in a thermostatic oven, and the internal resistance value of the model cell is measured while the temperature is raised at 5° C./min. By determining the temperature at which the measured internal resistance value is at least five times as large as that before heating (i.e., the resistance value measured at room temperature), this temperature can be evaluated as the shutdown temperature of the separator.

On the other hand, when imparting no shutdown function to the separator in order to place importance on the separator's heat resistance, a porous base material made of a heat-resistant resin can also be used. Such a heat-resistant resin may be any resin as long as it has a heat-resistant temperature of 150° C. or higher and is stable against a nonaqueous electrolyte used in the battery and moreover is stable against a redox reaction in the battery. More specifically, examples of such heat-resistant resins include polyimide, polyamideimide, aramid, polytetrafluoroethylene, polysulfone, polyurethane, PAN and polyesters (such as PET, PBT, and PEN).

As the porous base material, a microporous film produced by a conventionally-known method using any of the above-mentioned thermoplastic resins or any of the above-described heat-resistant resins can be used. For example, an ion permeable porous film produced by solvent extraction, dry or wet drawing (uniaxial or biaxial drawing) and the like can be used. Further, a film in which micropores are formed by foaming using an agent, supercritical $CO_2$, etc., can also be used.

A method that can be adapted to produce the separator of the present invention includes applying onto the surface of the porous base material the heat-resistant porous film forming composition as used in the formation of the heat-resistant porous film, and drying the applied composition to form a heat-resistant porous film layer on the surface of the porous base material. Further, the heat-resistant porous film obtained by the method of forming the heat-resistant porous film in the form of an independent film as explained above may be placed over the porous base material, and integrated with the porous base material using a roll press or the like.

When using plate-like particles as the fine particles having a heat-resistant temperature of 130° C. or higher, to improve the orientation of the fine particles, any of the various methods explained above as the methods for improving the orientation of the plate-like particles in the heat-resistant porous film can be used.

Since the separator of the present invention does not have to be composed of only one heat-resistant porous film and only one porous base material, the separator may include more than one heat-resistant porous film and porous base material. For example, the porous base materials may be disposed on both sides of the heat-resistant porous film or the heat-resistant porous films may be disposed on both sides of the porous base material. If too many heat-resistant porous films and porous films are included in total, however, the thickness of the separator is increased. This is not preferable because an increase in the thickness of the separator may lead to an increase in the internal resistance or a decline in the energy density of the battery Therefore, the total number of the heat-resistant porous films and the porous base materials in the separator is preferably 5 or less.

The separator of the present invention thus obtained has a thickness of preferably 5.5 μm or more, and more preferably 10 μm or more, for example, in terms of further improving the effect of preventing shorting in a battery, and ensuring the separator the strength to improve the ease of handling of the separator. On the other hand, the separator has a thickness of preferably 50 μm or less, and more preferably 30 μm or less in terms of further increasing the energy density of the battery.

Further, in the separator of the present invention, it is preferable that the ratio between X and Y (Y/X) is 1 to 20, where X (μm) is the thickness of the heat-resistant porous film and Y (μm) is the thickness of the porous base material, and that the thickness of the separator as a whole meets the range of the above-described preferred values. If Y/X is too large, the heat-resistant porous film becomes too thin. If a porous base material having poor size stability at high temperatures is used in this case, for example, the effect of reducing thermal shrinkage of the porous base material may be weakened. Further, if Y/X is too small, the heat-resistant porous film becomes too thick, causing an increase in the thickness of the separator as a whole. This may give raise to deterioration of the battery characteristics, such as weakening of the effect of improving the output characteristics. Note that when the separator includes more than one heat-resistant porous film, X indicates the total thickness of the heat-resistant porous films and when the separator includes more than one porous base material, Y indicates the total thickness of the porous base materials.

With reference to specific values, the thickness of the porous base material (the total thickness when the separator includes more than one porous base material) is preferably 5 μm or more, and preferably 30 μm or less. And the thickness of the heat-resistant porous film (the total thickness when the separator includes more than one heat-resistant porous film) is preferably 0.5 μm or more, more preferably 1 μm or more, and still more preferably 2 μm or more, and preferably 10 μm or less, more preferably 5 μm or less, and still more preferably 3 μm or less.

In order to ensure the amount of nonaqueous electrolyte to be retained in the separator to improve the ion permeability of the separator, the porosity of the separator is preferably 20% or more, and more preferably 30% or more in a dry state. The porosity of the separator can be determined using the above-mentioned formula (2) where m is the mass per unit area (g/cm$^2$) of the separator, and t is the thickness (cm) of the separator. On the other hand, in terms of ensuring the separator the strength and preventing internal shorting, the porosity of the separator determined by the above method is preferably 70% or less, and more preferably 60% or less in a dry state.

Furthermore, the porosity of the porous base material of the separator is preferably 30 to 70%. The porosity of the porous base material can be determined using the above-mentioned formula (2) where m is the mass per unit area (g/cm$^2$) of the porous base material, and t is the thickness (cm) of the porous base material. Further, as in the case of the heat-resistant porous film to be integrated with an electrode, it is preferable that the porosity of the heat-resistant porous film of the separator determined using the above formula (2) is 20% or more (more preferably 30% or more) and 70% or less (more preferably 60% or less).

It is preferable that the thermal shrinkage of the separator is 5% or less at 150° C., the thermal shrinkage being determined by a method later described in the Examples.

It is desirable that the separator has a strength of 50 g or more, the strength being a piercing strength obtained using a needle having a diameter of 1 mm. If the piercing strength is too small, shorting may occur when lithium dendrite crystals develop and penetrate through the separator.

It is desirable that the separator has an air permeability of 10 to 300 sec, which is indicated by a Gurley value. The Gurley value is obtained by a method according to JIS P 8117 and expressed as the length of time (seconds) it takes for 100 mL of air to pass through a membrane at a pressure of 0.879 g/mm$^2$. If the air permeability is too large, the ion permeability can be reduced. If the air permeability is too small, the strength of the separator may be reduced.

Furthermore, it is preferable that the Gurley value of the separator meets the relationship expressed by the following formula (3):

$$Gs \leq \max\{Ga, Gb\} + 10 \qquad (3)$$

where Gs is the Gurley value of the separator, Ga is the Gurley value of the porous base material, Gb is the Gurley value of the heat-resistant porous film, and max {a, b} is either a or b, whichever is larger. Note that Gb is determined using the following formula (4):

$$Gb = Gs - Ga \qquad (4).$$

By configuring the separator as explained thus far, it is possible to ensure the separator the thermal shrinkage, the strength and the air permeability as described above.

As long as the nonaqueous battery of the present invention includes a positive electrode, a negative electrode, and a nonaqueous electrolyte and uses the heat-resistant porous film of the present invention integrated with at least one of the positive electrode and the negative electrode as a separator material for separating the opposite electrodes from each other or uses the separator of the present invention as a separator material for separating the positive electrode and the negative electrode from each other, other components and structure are not particularly limited. Therefore, any of the various components and structures adopted in conventionally-known nonaqueous batteries (nonaqueous primary batteries such as a lithium primary battery and nonaqueous secondary batteries such as a lithium secondary battery) can be applied to the nonaqueous battery of the present invention. Hereinafter, the nonaqueous battery of the present invention in the form of a lithium secondary battery as a basic form will be described particularly in detail.

The form of the lithium secondary battery may be cylindrical (such as rectangular cylindrical or circular cylindrical) using a steel can, an aluminum can or the like as an outer can. Further, the lithium secondary battery may be in the form of a soft package battery using a metal-evaporated laminate film as an outer package.

The positive electrode is not particularly limited as long as it is the same as those used in conventionally-known lithium secondary batteries, i.e., as long as it is a positive electrode containing an active material capable of intercalating and deintercalating Li ions. Examples of applicable active materials include: lithium-containing transition metal oxides represented by $Li_{1+x}MO_2$ (−0.1<x<0.1; M: Co, Ni, Mn etc.); lithium manganese oxides such as $LiMn_2O_4$; $LiMn_xM_{(1-x)}O_2$ obtained by partially replacing Mn of $LiMn_2O_4$ with other element; olivine-type $LiMPO_4$ (M: Co, Ni, Mn, Fe); $LiMn_{0.5}Ni_{0.5}O_2$; and $Li_{(1+a)}Mn_xNi_yCo_{(1-x-y)}O_2$ (−0.1<a<0.1, 0<x<0.5, 0<y<0.5). To any of these positive electrode active materials, a known conductive assistant (e.g., a carbon material such as carbon black) and a binder such as polyvinylidene fluoride (PVDF) are added as appropriate to obtain a positive electrode material mixture, and the positive electrode material mixture formed into a compact (i.e., a positive electrode material mixture layer) with a current collector serving as the core material can be used as the positive electrode.

A foil, a punched metal, a mesh, and an expanded metal made of metal such as aluminum can be used as a positive electrode current collector, but typically an aluminum foil having a thickness of 10 to 30 μm is suitably used.

Generally, a positive electrode lead portion is provided in the following manner. At the time of the production of the positive electrode, the positive electrode material mixture layer is not formed on a part of the current collector to leave it exposed, and this exposed portion serves as the lead portion. Note that the lead portion does not need to be integral with the current collector from the beginning, and an aluminum foil or the like may be connected to the current collector afterwards to provide the lead portion.

The negative electrode is not particularly limited as long as it is the same as those used in conventionally-known lithium secondary batteries, i.e., as long as it is a negative electrode containing an active material capable of intercalating and deintercalting Li ions. Examples of usable active materials include carbon materials capable of intercalating and deintercalating lithium, such as graphite, pyrolytic carbons, cokes, glassy carbons, a calcined organic polymer compound, mesocarbon microbeads (MCMB), and carbon fibers. These active materials can be used alone or in combination of two or more as a mixture. Further, examples of materials that can be used as negative electrode active materials also include elements such as Si, Sn, Ge, Bi, Sb and In and alloys thereof, compounds that can be charged/discharged at a low voltage close to lithium metal such as lithium-containing nitrides and lithium-containing oxides, a lithium metal and a lithium/aluminum alloy. To any of these negative electrode active materials, a conductive assistant (e.g., a carbon material such as carbon black) and a binder such as PVDF are added as appropriate to obtain a negative electrode material mixture, and the negative electrode material mixture formed into a compact (i.e., a negative electrode material mixture layer) with a current collector serving as the core material can be used as the negative electrode. Alternatively, a negative electrode material mixture layer formed solely on a foil of any of the various alloys and lithium metals as described above or on a current collector can also be used as the negative electrode.

When using a current collector for the negative electrode, a foil, a punched metal, a mesh, an expanded metal or the like made of copper or nickel can be used but typically a copper foil is used. When the thickness of the negative electrode as a whole is reduced to obtain a high energy density battery, an upper limit of the thickness of the negative electrode current collector is preferably 30 μm and a lower limit is desirably 5 μm.

As in the case of the positive electrode lead portion, a negative electrode lead portion is also provided in the following manner. At the time of the production of the negative electrode, the negative electrode material layer (a layer having a negative electrode active material, including a negative electrode material mixture layer) is not formed on a part of the current collector to leave it exposed, and this exposed portion serves as the lead portion. Note that the negative electrode lead portion does not need to be integral with the current collector from the beginning, and a copper foil or the like may be connected to the current collector afterwards to provide the lead portion.

The positive electrode and the negative electrode as described above can be used in the form of a laminated electrode group obtained by laminating these electrodes through the separator of the present invention or combining the heat-resistant porous film of the present invention with at least one of the positive electrode and the negative electrode and laminating the positive electrode and the negative electrode through the heat-resistant porous film or can be used in the form of a wound electrode group obtained by further winding the laminated electrode group. When configuring the battery using a laminated composite of the heat-resistant porous film of the present invention and at least one of the positive electrode and the negative electrode, an additional separator (e.g., a polyolefin microporous film separator used in a battery such as a conventionally-known lithium secondary battery) may be used. However, because the heat-resistant porous film of the present invention serves as a separator material (i.e., as a separator) for separating the positive electrode and the negative electrode from each other, there is no particular need to use an additional separator.

As described above, a solution (nonaqueous electrolyte) obtained by dissolving a lithium salt in an organic solvent is used as the nonaqueous electrolyte. The lithium salt is not particularly limited as long as it can dissociate in the solvent into $Li^+$ ions and is less likely to cause side reactions such as decomposition in a voltage range where the battery is used. Examples of usable lithium salts include: inorganic lithium salts such as $LiClO_4$, $LiPF_6$, $LiBF_4$, $LiAsF_6$, and $LiSbF_6$; and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ (n≥2) and $LiN(R_fOSO_2)_2$ (where $R_f$ is a fluoroalkyl group).

The organic solvent used for the nonaqueous electrolyte is not particularly limited as long as it can dissolve the above-listed lithium salts and does not cause side reactions such as decomposition in a voltage range where the battery is used. Examples of the organic solvent include: cyclic carbonates such as ethylene carbonate, propylene carbonate, butylene carbonate and vinylene carbonate; chain carbonates such as dimethyl carbonate, diethyl carbonate and methyl ethyl carbonate; chain esters such as methyl propionate; cyclic esters such as γ-butyrolactone; chain ethers such as dimethoxyethane, diethyl ether, 1,3-dioxolane, diglyme, triglyme and tetraglyme; cyclic ethers such as dioxane, tetrahydrofuran and 2-methyltetrahydrofuran; nitriles such as acetonitrile, propionitrile and methoxy propionitrile; and sulfite esters such as ethylene glycol sulfite, and they can be used alone or in combination of two or more. To achieve a battery with more favorable characteristics, it is desirable to use a combination of the above organic solvents from which high conductivity can be achieved, such as a mixed solvent of an ethylene carbonate and a chain carbonate. Further, for the purpose of improving the characteristics of the battery such as the level of safety, charge-discharge cycle characteristics and high-temperature storability, additives such as vinylene carbonates, 1,3-propane sultone, diphenyl disulfide, cyclohexyl benzene, biphenyl, fluorobenzene and t-butyl benzene can be added to the nonaqueous electrolyte as appropriate.

The concentration of the lithium salt in the nonaqueous electrolyte is preferably 0.5 to 1.5 mol/L, and more preferably 0.9 to 1.25 mol/L.

Further, in place of the above-listed organic solvents, ambient temperature molten salts such as ethyl-methylimidazolium trifluoromethyl sulfonium imide, heptyl-trimethylammonium trifluoromethyl sulfonium imide, pyridinium trifluoromethyl sulfonium imide, and guadinium trifluoromethyl sulfonium imide can also be used.

Furthermore, a polymeric material that gelates the nonaqueous electrolyte by taking in the nonaqueous electrolyte may be added to the nonaqueous electrolyte, and the nonaqueous electrolyte in the form of a gel may be used in the battery. Examples of polymeric materials for gelating the nonaqueous electrolyte include known host polymers capable of forming a gel electrolyte, such as PVDF, vinylidene fluoride-hexafluoropropylene copolymers (PVDF-HFP), PAN, polyethylene oxide, polypropylene oxide, ethylene oxide-propylene oxide copolymers, crosslinked polymers having an ethylene oxide chain as its principal or side chain, and crosslinked poly(meth)acrylate.

EXAMPLES

Hereinafter, the present invention will be described in detail by way of Examples. It should be noted that the present invention is not limited to the following Examples. With respect to the fine particles having a heat-resistant temperature of 150° C., swellable fine particles and thermofusible fine particles used in the Examples, their average particle sizes were measured by the above-described method.

Example 1

Production of Electrodes

A positive electrode was produced as follows. First, 5 parts by mass of carbon black as a conductive assistant was added to 90 parts by mass of lithium-containing composite oxide $LiCoO_2$ (positive electrode active material), and they were mixed with each other. Then, to this mixture, a solution obtained by dissolving 5 parts by mass of PVDF in NMP was added, and they were mixed with each other to obtain a positive electrode material mixture-containing slurry. The slurry was passed though a 70-mesh screen to remove those having a large particle size. This positive electrode material mixture-containing slurry was applied uniformly onto both sides of a 15 μm-thick aluminum foil serving as a positive electrode current collector, and the applied slurry was dried. Then, after being pressed by a roll press to adjust the total thickness to 105 μm, the current collector coated with the slurry was cut into a strip, and an aluminum lead was welded to the strip, thus obtaining a strip-shaped positive electrode.

Further, a negative electrode was produced as follows. Artificial graphite as a negative electrode active material and PVDF as a binder were used, and they were mixed with each other at a mass ratio of 95:5. NMP was further added to the mixture, and they were mixed with each other to obtain a negative electrode material mixture-containing paste. This negative electrode material mixture-containing paste was applied uniformly onto both sides of a 10 μm-thick copper foil serving as a negative electrode current collector, and the applied paste was dried. Then, after being pressed by a roll press to adjust the total thickness to 100 μm, the current collector coated with the paste was cut into a strip, and a nickel lead was welded to the strip, thus obtaining a strip-shaped negative electrode.

Preparation of Nonaqueous Electrolyte

A nonaqueous electrolyte was prepared by dissolving $LiPF_6$ in a mixed solvent of ethylene carbonate, methyl ethyl carbonate and diethyl carbonate at a volume ratio of 10:10:30 in a concentration of 1.0 mol/L to obtain a solution, and adding vinylene carbonate to the solution such that vinylene carbonate accounted for 2.5 mass % of the total mass of the nonaqueous electrolyte.

Production of Separator 4000 g of boehmite powder (plate-shaped, average particle size: 1 μm, aspect ratio: 10, specific surface area: 8 $m^2$/g) serving as the fine particles having a heat-resistant temperature of 130° C. or higher was added to 4000 g of water at four times, and they were stirred with a disperser for 5 hours at 2800 rpm to prepare a uniform slurry. To this dispersion, 800 g of aqueous solution of PVP having a weight-average molecular weight of 3,500,000 ["K-120 (trade name)" manufactured by ISP Japan Co., Ltd., Tg: 176° C.] as an organic binder (concentration: 10 mass %) was added, and water was further added to the dispersion, and all were stirred at room temperature until the ingredients were dispersed uniformly, thus preparing a slurry (heat-resistant porous film forming slurry) having a solid content of 30 mass %.

A three-layered polyolefin microporous film in which a PE microporous film was sandwiched between PP microporous films (thickness: 16 μm, porosity: 40%; thickness of each layer: PP layer: 5 μm/PE layer: 6 μm/PP layer: 5 μm; melting point of PE of PE layer: 135° C.) was prepared, and one side of the polyolefin microporous film was surface treated with a corona discharge. Then, onto the side of the three-layered polyolefin microporous film surface treated with a corona discharge, the slurry was applied with a microgravure coater, and the applied slurry was dried to form a heat-resistant porous film, thus obtaining a separator having a thickness of 20 μm. The organic binder accounted for 6 vol % of the total volume of the components of the heat-resistant porous film of the separator, and the porosity of the heat-resistant porous film was 53%.

Assembly of Battery

The positive electrode and the negative electrode were placed over one other through the separator thus obtained such that the heat-resistant porous film opposed the positive electrode, and they were wound in a spiral fashion to produce a wound electrode group. The obtained wound electrode group was placed in an iron outer can having a diameter of 18 mm and a height of 65 mm, the nonaqueous electrolyte was injected into the outer can, and then the outer can was sealed. Thus, a lithium secondary battery having the structure as shown in FIG. 1 was produced. This lithium secondary battery had a design electric capacity of 1400 mAh when being charged up to 4.2 V (the potential of the positive electrode being 4.3 V on a Li basis) (all of the lithium secondary batteries of Examples and Comparative Examples described later also had the same design battery capacity).

Here, the battery shown in FIG. 1 will be explained. In the lithium secondary battery shown in FIG. 1, a positive electrode 1 and a negative electrode 2 are wound in a spiral fashion through a separator 3, and are housed, together with a nonaqueous electrolyte 4, in an outer can 5 as a wound electrode group. For the sake of simplicity FIG. 1 does not illustrate, for example, current collectors used to produce the positive electrode 1 and the negative electrode 2.

An insulator 6 made of PP has been placed at the bottom of the outer can 5 prior to the insertion of the wound electrode group. A sealing plate 7 is made of aluminum and is disc-shaped. The sealing plate 7 has a thinned section 7a at its central portion, and is provided, at the periphery of the thinned section 7a, a hole serving as a pressure inlet 7b for allowing the internal pressure of the battery to be exerted on an explosion-proof valve 9. Also, a projecting portion 9a of the explosion-proof valve 9 is welded to the top surface of the thinned section 7a, thus forming a weld portion 11. To facilitate the understanding of the drawing, the thinned section 7a provided in the sealing plate 7, the projecting portion 9a of the explosion-proof valve 9, and the like are shown only in section, and illustration of the outline behind the section is omitted. Also, the weld portion 11 of the thinned section 7a of the sealing plate 7 and the projecting portion 9a of the explosion-proof valve 9 are illustrated in an exaggerated manner to facilitate the understanding of the drawing.

A terminal plate 8 is made of rolled steel, is plated with nickel on the surface, and has the shape of a hat having a flange-shaped peripheral portion. The terminal plate 8 is provided with a gas outlet 8a. The explosion-proof valve 9 is made of aluminum and has the shape of a disc. The explosion-proof valve 9 is provided, at its central portion, the projecting portion 9a having a tip portion on the power generating element side (the lower side in FIG. 1) and is also provided with a thinned section 9b. As described above, the bottom surface of the projecting portion 9a is welded to the top surface of the thinned section 7a of the sealing plate 7, thus forming the weld portion 11. A ring-shaped insulating packing 10 made of PP is disposed above the peripheral portion of the sealing plate 7. The explosion-proof valve 9 is disposed above the insulating packing 10, and provides insulation between the sealing plate 7 and the explosion-proof valve 9, while sealing the gap between the sealing plate 7 and the explosion-proof valve 9 so as to prevent leakage of the nonaqueous electrolyte from the space therebetween. A ring-shaped gasket 12 is made of PP. A lead member 13 is made of aluminum, and connects the sealing plate 7 to the positive electrode 1. An insulator 14 is disposed above the wound electrode group, and the negative electrode 2 and the bottom of the outer can 5 were connected by a lead member 15 made of nickel.

In this battery, the thinned section 7a of the sealing plate 7 and the projecting portion 9a of the explosion-proof valve 9 are in contact at the weld portion 11, the peripheral portion of the explosion-proof valve 9 and the peripheral portion of the terminal plate 8 are in contact, and the positive electrode 1 and the sealing plate 7 are connected by the lead member 13 on the positive electrode side. Accordingly, in an ordinary state, the positive electrode 1 and the terminal plate 8 are electrically connected by the lead member 13, the sealing plate 7, the explosion-proof valve 9, and the weld portion 11 of the sealing plate 7 and the explosion-proof valve 9, and thus normally operate as an electric circuit.

In the case where an abnormality occurs in the battery, for example, when the battery is exposed to high temperatures, and the internal pressure of the battery is increased due to gas generated inside the battery, such an increase in the internal pressure causes the central portion of the explosion-proof valve 9 to be deformed in the direction of the internal pressure (upward in FIG. 1). As a result, shearing force is exerted on the thinned section 7a, which is integrated with the explosion-proof valve 9 at the weld portion 11, and the thinned section 7a is broken, or the weld portion 11 of the projecting portion 9a of the explosion-proof valve 9 and the thinned section 7a of the sealing plate 7 is detached. Thereafter, the thinned section 9b provided in the explosion-proof valve 9 ruptures to release the gas from the gas outlet 8a of the terminal plate 8 to the outside of the battery, and thereby the battery is designed to be prevented from explosion.

Example 2

4000 g of the same boehmite powder as the one used in Example 1 was added to 4000 g of water at four times, and they were stirred with the disperser for 5 hours at 2800 rpm to prepare a uniform dispersion. To this dispersion, 800 g of aqueous solution of PVP having a weight-average molecular weight of 1,600,000 ["K-90 (trade name)" manufactured by ISP Japan Co., Ltd., Tg: 174° C.] as an organic binder (concentration: 10 mass %) was added, and water was further added to the dispersion, and all were stirred at room temperature until the ingredients were dispersed uniformly, thus preparing a slurry having a solid content of 30 mass %. To this slurry, a fluorochemical surfactant (perfluoroalkyl ethylene oxide adduct) was added in amount of 0.1 parts by mass with respect to 100 parts by mass of water, and they were stirred until the surfactant was distributed uniformly, thus obtaining a heat-resistant porous film forming slurry.

The above slurry was applied with the gravure coater onto one side of the same three-layered polyolefin microporous film (not being treated with a corona discharge) as the one used in Example 1, and then the applied slurry was dried to form a heat-resistant porous film, thus obtaining a separator having a thickness of 20 μm. The organic binder accounted for 6 vol % of the total volume of the components of the heat-resistant porous film of the separator, and the porosity of the heat-resistant porous film was 52%.

And except for using the above separator, a lithium secondary battery was produced in the same manner as in Example 1.

Example 3

A heat-resistant porous film forming slurry having a solid content of 30 mass % was prepared in the same manner as in Example 1 except that the organic binder aqueous solution to be added to the boehmite dispersion was changed to an aqueous solution of PVP having a weight-average molecular weight of 400,000 ["K-60 (trade name)" manufactured by ISP Japan Co., Ltd., Tg: 170° C.] (concentration: 10 mass %). And except for using this slurry, a separator having a thickness of 20 μm was produced in the same manner as in Example 1. The organic binder accounted for 6 vol % of the total volume of the components of the heat-resistant porous film of the separator, and the porosity of the heat-resistant porous film was 53%.

And except for using the above separator, a lithium secondary battery was produced in the same manner as in Example 1.

Example 4

4000 g of the same boehmite powder as the one used in Example 1 was added to 4000 g of water at four times, and they were stirred with the disperser for 5 hours at 2800 rpm to prepare a uniform dispersion. To this dispersion, 4000 g of aqueous dispersion of crosslinked PMMA fine particles (swellable fine particles; average particle size: 0.4 μm) (solid content: 40 mass %) and 800 g of aqueous solution of PVP having a weight-average molecular weight of 3,500,000 ["K-120 (trade name)" manufactured by ISP Japan Co., Ltd., Tg: 176° C.] (concentration: 10 mass %) were added, and water was further added to the dispersion, and all were stirred at room temperature until the ingredients were dispersed uniformly, thus preparing a heat-resistant porous film forming slurry having a solid content of 30 mass %.

The above slurry was applied with the gravure coater to the same three-layered polyolefin microporous film as the one used in Example 1 such that the slurry was applied onto the side that had been treated with a corona discharge, and then the applied slurry was dried to form a heat-resistant porous film, thus obtaining a separator having a thickness of 20 μm. The organic binder accounted for 6 vol % of the total volume of the components of the heat-resistant porous film of the separator, and the porosity of the heat-resistant porous film was 51%.

And except for using the above separator, a lithium secondary battery was produced in the same manner as in Example 1.

Example 5

A boehmite powder (average particle size: 0.06 μm, specific surface area: 100 m$^2$/g) in the form of secondary particles composed of joined primary particles was used as the fine particles having a heat-resistant temperature of 130° C. or higher, and 4000 g of this boehmite powder was added to 4000 g of water at four times, and they were stirred with the disperser for 5 hours at 2800 rpm to prepare a uniform dispersion. To this dispersion, 4000 g of aqueous dispersion of PE fine particles (thermofusible fine particles; melting point: 135° C., average particle size: 1.0 μm) (solid content: 40%) and 1200 g of aqueous solution of PVP having a weight-average molecular weight of 3,500,000 ["K-120 (trade name)" manufactured by ISP Japan Co., Ltd., Tg: 176° C.] (concentration: 10 mass %) were added, and water was further added to the dispersion, and all were stirred at room temperature until the ingredients were dispersed uniformly, thus preparing a heat-resistant porous film forming slurry having a solid content of 30 mass %.

A piece of PET nonwoven fabric (unit weight: 8 g/m$^2$, thickness: 16 μm) was prepared as a porous base material, and the piece of PET nonwoven fabric was dip-coated with the above slurry. Then, the applied slurry was dried to form a heat-resistant porous film, thus obtaining a separator having a thickness of 20 μm. The organic binder accounted for 9 vol % of the total volume of the components of the heat-resistant porous film of the separator, and the porosity of the heat-resistant porous film was 51%.

And except for using the above separator, a lithium secondary battery was produced in the same manner as in Example 1.

Example 6

An alumina powder (average particle size: 0.4 μm, specific surface area 7 m$^2$/g) was prepared as the fine particles having a heat-resistant temperature of 130° C. or higher, and 4000 g of this alumina powder was added to 4000 g of water at four times, and they were stirred with the disperser for 5 hours at 2800 rpm to prepare a uniform dispersion. To this dispersion, 4000 g of aqueous dispersion of PE fine particles (thermofusible fine particles, melting point: 135° C., average particle size: 1.0 μm) (solid content: 40%) and 1200 g of aqueous solution of PVP having a weight-average molecular weight of 3,500,000 ["K-120 (trade name)" manufactured by ISP Japan Co., Ltd., Tg: 176° C.] (concentration: 10 mass %) were added, and water was further added to the dispersion, and all were stirred at room temperature until the ingredients were dispersed uniformly, thus preparing a heat-resistant porous film forming slurry having a solid content of 30 mass %.

The above slurry was applied with the gravure coater to the same negative electrode as the one produced in Example 1 such that the slurry was applied onto the negative electrode material mixture layer of the negative electrode, and then the applied slurry was dried to form a heat-resistant porous film having a thickness of 20 μm, thus obtaining a laminated composite of the negative electrode and the heat-resistant porous film. The organic binder accounted for 15 vol % of the total volume of the components of the heat-resistant porous film, and the porosity of the heat-resistant porous film was 46%.

The laminated composite of the negative electrode and the heat-resistant porous film and the same positive electrode as the one produced in Example 1 were placed over one another, and they were wound in a spiral fashion to produce a wound electrode group. And except for using this electrode group, a lithium secondary battery was produced in the same manner as in Example 1.

Example 7

The same heat-resistant porous film forming slurry as the one prepared in Example 6 was applied with the gravure coater to the same negative electrode as the one produced in Example 1 such that the slurry was applied onto the negative electrode material mixture layer of the negative electrode, and then the applied slurry was dried to form a heat-resistant porous film having a thickness of 10 μm, thus obtaining a laminated composite of the negative electrode and the heat-resistant porous film.

Further, the same heat-resistant porous film forming slurry as the one prepared in Example 6 was applied with the gravure coater to the same positive electrode as the one produced in Example 1 such that the slurry was applied onto the positive electrode material mixture layer of the positive electrode, and then the applied slurry was dried to form a heat-resistant porous film having a thickness of 10 μm, thus obtaining a laminated composite of the positive electrode and the heat-resistant porous film.

In the heat-resistant porous films that each formed the laminated composite with the negative electrode and that with the positive electrode, the organic binder accounted for 15 vol % of the total volume of the components, and the porosity of each heat-resistant porous film was 46%.

The laminated composite of the negative electrode and the heat-resistant porous film and the laminated composite of the positive electrode and the heat-resistant porous film were placed over one other, and they were wound in a spiral fashion to produce a wound electrode group. And except for using this electrode group, a lithium secondary battery was produced in the same manner as in Example 1.

Comparative Example 1

A heat-resistant porous film forming slurry having a solid content of 30 mass % was prepared in the same manner as in Example 1 except that the organic binder aqueous solution to be added to the boehmite dispersion was changed to an aqueous solution of PVP having a weight-average molecular weight of 70,000 ["K-30 (trade name)" manufactured by ISP Japan Co., Ltd., Tg: 163° C.] (concentration: 10 mass %). And except for using this slurry, a separator having a thickness of 20 μm was produced in the same manner as in Example 1. The organic binder accounted for 6 vol % of the total volume of the components of the heat-resistant porous film of the separator, and the porosity of the heat-resistant porous film was 53%.

And except for using the above separator, a lithium secondary battery was produced in the same manner as in Example 1.

Comparative Example 2

A heat-resistant porous film forming slurry was prepared in the same manner as in Example 1 except that a boehmite powder having an average particle size of 0.005 μm and a specific surface area of 250 m$^2$/g was used as the fine particles having a heat-resistant temperature of 130° C. or higher. And except for using this slurry, a separator including the heat-resistant porous film and having a thickness of 20 μm was produced in the same manner as in Example 1. The organic binder accounted for 6 vol % of the total volume of the components of the heat-resistant porous film of the separator, and the porosity of the heat-resistant porous film was 46%.

And except for using the above separator, a lithium secondary battery was produced in the same manner as in Example 1.

Comparative Example 3

4000 g of the same boehmite powder as the one used in Example 1 was added to 4000 g of water at four times, and they were stirred with a disperser for 5 hours at 2800 rpm to prepare a uniform dispersion. To this dispersion, 200 g of aqueous solution of PVP having a weight-average molecular weight of 1,600,000 ["K-90 (trade name)" manufactured by ISP Japan Co., Ltd., Tg: 174° C.] (concentration: 10 mass %) as an organic binder was added, and water was further added to the dispersion, and all were stirred at room temperature until the ingredients were dispersed uniformly, thus preparing a heat-resistant porous film forming slurry.

And except for using the above slurry, a separator including the heat-resistant porous film and having a thickness of 20 μm was produced in the same manner as in Example 1. And except for using this separator, a lithium secondary battery was produced in the same manner as in Example 1. The organic binder accounted for 1.5 vol % of the total volume of the components of the heat-resistant porous film of the separator, and the porosity of the heat-resistant porous film was 57%.

Each of the following evaluations was made on the lithium secondary batteries of Examples and Comparative Examples as well as on the separators or the heat-resistant porous films used in the batteries of Examples and Comparative Examples.

Thermal Shrinkage Test of Separators or Heat-resistant Porous Films

From each of the separators used in the batteries of Examples 1 to 5 and Comparative Examples 1 to 3 and the negative electrode-and-heat-resistant porous film laminated composites used in the batteries of Examples 6 and 7, a strip-shaped sample piece 5 cm in a MD direction and 10 cm in a TD direction was cut. Here, the MD direction refers to the machine direction during the production of the separators or the negative electrode-and-heat resistant porous film laminated composites, and the TD direction refers to the direction perpendicular to the MD direction.

With an oil magic marker, 3 cm lines parallel to the longer side direction (TD direction) and to the shorter side direction (MD direction) were marked on each sample such that the line in the longer side direction and that in the shorter side direction intersected at the center. The intersection of these lines was set as the center of each line. These samples were hung in a thermostatic oven, and the temperature in the thermostatic oven was raised at a rate of 5° C./min. After the temperature reached 150° C., the temperature was maintained at 150° C. for one hour. The length of the marked lines in the longer side direction and the shorter side direction obtained after the stationary operation at 150° C. for one hour from the beginning of the test was measured. And the thermal shrinkage of each sample in each direction was calculated by obtaining the difference in marked line length before and after the heating, and determining the ratio between the obtained difference and the length before the heating. Note that between the thermal shrinkage in the longer side direction and that in the shorter side direction, whichever was larger in value was adopted as the thermal shrinkage of each of the separators and the heat-resistant porous films.

Evaluation of Charge-Discharge Characteristics

Each of the batteries of the Examples and Comparative Examples was charged under the following conditions, and the charge capacity and the discharge capacity were each determined, and the ratio of the discharge capacity to the charge capacity was evaluated as the charge efficiency. Each of the batteries was charged at a constant current and a constant voltage such that each battery was first charged at a constant current of 0.2 C until the battery voltage reached 4.2 V, and then was charged at a constant voltage of 4.2 V. The total charging time until the end of charging was 15 hours.

After being charged, each battery was discharged at a discharge current of 0.2 C until the battery voltage became 3.0 V. It was found that the batteries of Examples 1 to 7 and Comparative Examples 1 to 3 had charge efficiency of almost 100% and that they were able to operate favorably as batteries.

Evaluation of High-Temperature Storability

The batteries of Examples and Comparative Examples was each charged under the same conditions as in the charge-discharge characteristic evaluation, and then they were stored in a 60° C. environment for 20 days. Subsequently, after restoring the batteries to room temperature, each of the batteries was discharged until the battery voltage became 3.0 V. To determine the capacity retention after the high-temperature storage, the discharge capacity of each battery was obtained, the obtained discharge capacity was divided by the discharge capacity determined during the charge-discharge characteristic evaluation, and the value obtained from the division was expressed as a percentage. That is, it can be said that the batteries having higher capacity retention after the high-temperature storage had more favorable high temperature storability.

Heating Test

The batteries of Examples and Comparative Examples (three batteries per each Example/Comparative Example) were charged at a constant current of 0.5 C until the battery voltage reached 4.35 V. The charging was carried out in a 20.0 to 25° C. ambient atmosphere, and the batteries whose surface temperature was the same as the temperature of the ambient atmosphere were used. The charged batteries were placed in a thermostatic oven and the temperature in the thermostatic oven was raised at a rate of 5° C./min. After reaching 150° C., the temperature was maintained at 150° C. for 3 hours more. From the moment where the temperature in the thermostatic oven was first raised to the moment where the stationary operation at 150° C. for 3 hours ended, the highest temperature that each battery reached was measured through a thermocouple connected onto the battery surface. For each of Examples and Comparative Examples, the average highest temperature of three batteries was determined.

Table 1 provides the results of each evaluation (in Table 1, the thermal shrinkage of each of the separators or the heat-resistant porous films is simply labeled as "Thermal shrinkage"). Further, with regard to each of the heat-resistant porous films used in the batteries of the Examples and Comparative Examples, Table 1 also provides the weight-average molecular weight of PVP used, the percentage of the organic binder used (the organic binder content with respect to the total volume of the components of the heat-resistant porous film) and the 180° peel strength (labeled as "Peel strength" in Table 1) between the heat-resistant porous film and the porous base material or negative electrode.

TABLE 1

|  | Heat-resistant porous film | | | | Capacity retention after high temperature storage (%) | Highest temperature reached in heating test (C. °) |
| --- | --- | --- | --- | --- | --- | --- |
|  | Weight-average molecular weight of PVP | Percentage of organic binder (vol %) | Peel strength (N/cm) | Thermal shrinkage (%) | | |
| Ex. 1 | 3,500,000 | 6 | 1.8 | 3 | 90 | 154 |
| Ex. 2 | 1,600,000 | 6 | 1.0 | 1 | 89 | 153 |
| Ex. 3 | 400,000 | 6 | 0.6 | 5 | 86 | 155 |
| Ex. 4 | 3,500,000 | 6 | 1.6 | 2 | 89 | 153 |
| Ex. 5 | 3,500,000 | 9 | 2.4 | 1 | 88 | 152 |
| Ex. 6 | 3,500,000 | 15 | 1.6 | 2 | 89 | 153 |
| Ex. 7 | 3,500,000 | 15 | 2.0 | 0 | 90 | 153 |
| Comp. Ex. 1 | 70,000 | 6 | 0.3 | 20 | 74 | 160 |
| Comp. Ex. 2 | 3,500,000 | 6 | 0.1 | 40 | 86 | 167 |

TABLE 1-continued

| | Heat-resistant porous film | | | | Capacity retention | Highest temperature |
| | Weight-average molecular weight of PVP | Percentage of organic binder (vol %) | Peel strength (N/cm) | Thermal shrinkage (%) | after high temperature storage (%) | reached in heating test (C. °) |
|---|---|---|---|---|---|---|
| Comp. Ex. 3 | 1,600,000 | 1.5 | 0.2 | 30 | 88 | 165 |

As can be seen from Table 1, each of the lithium secondary batteries of Examples 1 to 7, in which PVP having a certain Tg and a certain weight-average molecular weight was used as the organic binder and the peel strength between the heat-resistant porous film and the porous base material or electrode met the range of certain values, had higher capacity retention after the high-temperature storage and better high-temperature storability than the lithium secondary battery of Comparative Example 1 in which PVP having a low weight-average molecular weight was used in its heat-resistant porous film.

Further, the separators or the heat-resistant porous films used in the lithium secondary batteries of Examples 1 to 7 had a small thermal shrinkage at 150° C. Therefore, it can be said that each of the batteries of Examples 1 to 7 was highly safe because the separator or the heat-resistant porous film resistant to shrinkage even at high temperatures was able to separate the positive electrode and the negative electrode from each other favorably. In fact, the highest temperature that each of the batteries of Examples 1 to 7 reached during the heating test was minimized, showing that these batteries had a favorable level of safety.

On the other hand, in each of the batteries of Comparative Examples 1 to 3, the 180° peel strength between the heat-resistant porous film and the porous base material of the separator used was poor, and this caused an increase in the thermal shrinkage of the separator at 150° C. Therefore, it can be said that the batteries of Comparative Examples 1 to 3 were less safe than the batteries of Examples because there was the possibility of direct contact between the positive and negative electrodes due to the shrinkage of the separators at high temperatures. In fact, the highest temperature that the batteries of Comparative Examples 1 to 3 reached during the heating test was higher than that of the batteries of Examples, showing that they had a poor level of safety.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

The nonaqueous battery of the present invention can be used in various applications where nonaqueous batteries such as conventionally-known lithium secondary batteries have been used.

The invention claimed is:

1. A heat-resistant porous film formed on a porous base material for forming a separator for a nonaqueous battery or on an electrode used in a nonaqueous battery, wherein the heat-resistant porous film comprises at least an organic binder and particles having a heat-resistant temperature of 130° C. or higher, the heat-resistant porous film has pores capable of transmitting Li ions in the nonaqueous battery, as the organic binder, the heat-resistant porous film comprises a polymer having a backbone derived from a polymeric double bond and a group having a cyclic structure including an amide bond, the polymer having a glass transition temperature of 130° C. or higher and a weight-average molecular weight of 350,000 or more, and a 180° peel strength between the heat-resistant porous film and the porous base material or the electrode is 0.6 N/cm or more.

2. The heat-resistant porous film according to claim 1, wherein in the polymer having a backbone derived from a polymeric double bond and a group having a cyclic structure including an amide bond, the group having a cyclic structure including an amide bond is a group represented by the following chemical formula (1) and the polymer has a glass transition temperature of 150° C. or higher:

(1)

3. The heat-resistant porous film according to claim 1, wherein the polymer having a backbone derived from a polymeric double bond and a group having a cyclic structure including an amide bond is polyvinyl pyrrolidone.

4. The heat-resistant porous film according to claim 1, further comprising resin particles having a melting point of 80 to 150° C.

5. The heat-resistant porous film according to claim 1, further comprising particles that swell in a nonaqueous electrolyte at a temperature of 80 to 150° C. due to an increase in the amount of the nonaqueous electrolyte absorbed by the particles.

6. A separator for a nonaqueous battery, wherein a porous base material and the heat-resistant porous film according to claim 1 are integrated with each other.

7. The separator according to claim 6, wherein the porous base material is a polyolefin microporous film.

8. The separator according to claim 6, wherein the separator has a thermal shrinkage of 5% or less at 150° C.

9. A nonaqueous battery comprising a positive electrode, a negative electrode, and a nonaqueous electrolyte, wherein the heat-resistant porous film according to claim 1 is integrated with at least one of the positive electrode and the negative electrode.

10. A nonaqueous battery comprising a positive electrode, a negative electrode, a separator and a nonaqueous electrolyte,
   wherein the separator is the separator according to claim 6.

* * * * *